US010516849B2

(12) United States Patent
Wang

(10) Patent No.: US 10,516,849 B2
(45) Date of Patent: Dec. 24, 2019

(54) VIDEO CALL METHOD, APPARATUS AND SYSTEM

(71) Applicant: Beijing Xiaomi Mobile Software Co., Ltd., Beijing (CN)

(72) Inventor: Ke Wang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/039,625

(22) Filed: Jul. 19, 2018

(65) Prior Publication Data

US 2019/0037169 A1 Jan. 31, 2019

(30) Foreign Application Priority Data

Jul. 27, 2017 (CN) .......................... 2017 1 0625490

(51) Int. Cl.
*H04N 7/14* (2006.01)
*H04N 5/232* (2006.01)

(52) U.S. Cl.
CPC ......... *H04N 7/141* (2013.01); *H04N 5/23245* (2013.01)

(58) Field of Classification Search
USPC ................................ 348/14.01, 14.08, 14.09
See application file for complete search history.

(56) References Cited

U.S. PATENT DOCUMENTS

| | | | | |
|---|---|---|---|---|
| 2010/0245532 A1* | 9/2010 | Kurtz | G06K 9/00711 | 348/14.03 |
| 2011/0249079 A1* | 10/2011 | Santamaria | H04M 7/0057 | 348/14.02 |
| 2015/0207970 A1* | 7/2015 | Min | H04N 5/2258 | 348/14.07 |

FOREIGN PATENT DOCUMENTS

| | | |
|---|---|---|
| CN | 1473430 A | 2/2004 |
| CN | 105611216 A | 5/2016 |
| EP | 2 114 073 A2 | 11/2009 |
| GB | 2466333 A | 6/2010 |
| KR | 2003-0073014 A | 9/2003 |
| WO | WO 02/37848 A1 | 5/2002 |

OTHER PUBLICATIONS

Extended European Search Report dated Nov. 12, 2018 in Patent Application No. 18186050.3, 8 pages.

First Office Action of Chinese Patent Application No. 201710625490.8, from the Chinese Patent office, dated Mar. 21, 2019.

* cited by examiner

*Primary Examiner* — Quoc D Tran

(74) *Attorney, Agent, or Firm* — Oblon, McClelland, Maier & Neustadt, L.L.P.

(57) ABSTRACT

The present disclosure relates to a video call method, apparatus, devices, non-transitory computer-readable medium, and system. The video call method includes receiving, from a first user device, a video call request to conduct a video call with a second user device; receiving, from the first user device, a first instruction that is configured to instruct the serving device to control the first user device and the second user device to conduct the video call with each other; and controlling the first user device and the second user device to conduct the video call with each other based on the first instruction.

20 Claims, 11 Drawing Sheets

RECEIVING A VIDEO CALL REQUEST SENT FROM A SERVING DEVICE — 501

CONTROLLING A CAMERA TO START A SELFIE MODE — 502

AFTER RECEIVING A VIDEO CALL REQUEST SENT FROM A SERVING DEVICE, SENDING A NOTIFICATION MESSAGE TO THE SERVING DEVICE — 601

GENERATING A SECOND INSTRUCTION AFTER OR AT THE END OF THE SELFIE MODE, AND SENDING THE SECOND INSTRUCTION TO THE SERVING DEVICE — 503

VIDEO CALL METHOD, APPARATUS AND SYSTEM

CROSS-REFERENCE TO RELATED APPLICATIONS

This application is based upon and claims priority to Chinese Patent Application No. 201710625490.8, filed on Jul. 27, 2017, the entire contents of which are incorporated herein by reference.

TECHNICAL FIELD

The present disclosure relates to the technical field of telecommunications, and more particularly, to a video call method, apparatus, and system.

BACKGROUND

With the growth of popularity of smart terminal devices and the rapid development of communication technology, traditional voice services and message services may no longer meet people's communication needs, and more and more people prefer video calls for communicating with each other. Generally, during setup of a video call, an initiating user of a video call may send a video call invitation. Once a receiving user of the video call accepts the video call invitation, a communication line/connection is set up successfully. However, there may be cases where a connection for a video call is suddenly set up while a user is not ready for the video call. Due to a lack of time for the user to properly prepare for the video call, the user may feel embarrassed for his/her improper attire and appearance.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a video call method, apparatus, devices, non-transitory computer-readable medium, and system to solve the problem existing in the related art and resulting from there being insufficient time for a user to tidy his/her attire and appearance before a video call connection is established Specifically, Aspects of the disclosure provide a video call method performed by a serving device. The method includes receiving, from a first user device, a video call request to conduct a video call with a second user device; receiving, from the first user device, a first instruction that is configured to instruct the serving device to control the first user device and the second user device to conduct the video call with each other; and controlling the first user device and the second user device to conduct the video call with each other based on the first instruction.

In an example, the first instruction is generated by the first user device after a selfie mode is initiated by the first user device and before any corresponding video call content is generated for contents photographed by the first user device in the selfie mode.

In another example, when controlling the first user device and the second user device to conduct the video call with each other, the method includes receiving, from the second user device, a notification message that is configured to notify the serving device that the second user device accepts the video call request; and receiving, from the second user device, a second instruction that is configured to instruct the serving device to control the first user device and the second user device to conduct the video call with each other, wherein the second instruction is generated by the second user device after a selfie mode is initiated by the second user device and before any corresponding video call content is generated for contents photographed by the second user device in the selfie mode.

According to an aspect, after receiving the notification message from the second user device, the method includes controlling the second user device to initiate the selfie mode.

According to another aspect, after receiving the notification message from the second user device, the method includes sending a prompt instruction to the first user device, wherein the prompt instruction is configured to instruct the first user device to generate a prompt indicating that the second user device has accepted the video call request.

According to yet another aspect, after receiving the notification message from the second user device, the method includes sending a prompt instruction to the first user device, wherein the prompt instruction is configured to instruct the first user device to generate a prompt indicating that the second user device has accepted the video call request.

In an example, the first user device is configured to in response to receiving a first user operation, generate the video call request to conduct the video call with the second user device; control a camera to initiate a selfie mode; generate the first instruction after initiating the selfie mode; and send the first instruction to the serving device so as to instruct the serving device to control, based on the video call request, the second user device and the first user device to conduct the video call with each other.

In another example, the first instruction is generated when a first preset time period has passed since the video call request is generated or when a second user operation is received.

In yet another example, the second user device is configured to receive, from the serving device, the video call request for the second user device to conduct the video call with the first user device; control a camera to initiate a selfie mode; generate a second instruction after initiating the selfie mode; and send the second instruction to the serving device so as to instruct the serving device to control the second user device and the first user device to conduct the video call with each other.

In yet another example, the second user device is further configured to, after receiving the video call request sent from the serving device, send a notification message to the serving device so as to notify the serving device that the second user device accepts the video call request.

In yet another example, the second instruction is generated when a second preset time period has passed since the notification message is sent or when a third user operation is received.

In yet another example, the second instruction is generated when a second preset time period has passed since the notification message is sent or when a third user operation is received.

Aspects of the disclosure also provide a serving device. The serving device includes a processor and a memory storing instructions executable by the processor. The processor is configured to receive, from a first user device, a video call request to conduct a video call with a second user device; receive, from the first user device, a first instruction that is configured to instruct the serving device to control the first user device and the second user device to conduct the video call with each other; and control the first user device and the second user device to conduct the video call with each other based on the first instruction.

Aspects of the disclosure also provide a non-transitory computer-readable medium storing instructions that, when executed by one or more processors of a serving device, cause the serving device to receive, from a first user device, a video call request to conduct a video call with a second user device; receive, from the first user device, a first instruction that is configured to instruct the serving device to control the first user device and the second user device to conduct the video call with each other; and control the first user device and the second user device to conduct the video call with each other based on the first instruction. The first user device is configured to, in response to receiving a first user operation, generate the video call request to conduct the video call with the second user device; control a first camera to initiate a first selfie mode; generate the first instruction after initiating the first selfie mode; and send the first instruction to the serving device so as to instruct the serving device to control, based on the video call request, the second user device and the first user device to conduct the video call with each other. The second user device is configured to receive, from the serving device, the video call request for the second user device to conduct the video call with the first user device; control a second camera to initiate a second selfie mode; generate a second instruction after initiating the second selfie mode; and send the second instruction to the serving device so as to instruct the serving device to control the second user device and the first user device to conduct the video call with each other.

It is to be understood that both the foregoing general description and the following detailed description are illustrative and explanatory only and are not restrictive of the present disclosure, as claimed.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise indicated. The implementations set forth in the following description of exemplary aspects do not represent all implementations consistent with the disclosure. Instead, they are merely examples of apparatuses and methods consistent with aspects related to the disclosure as recited in the appended claims.

Figure 1:
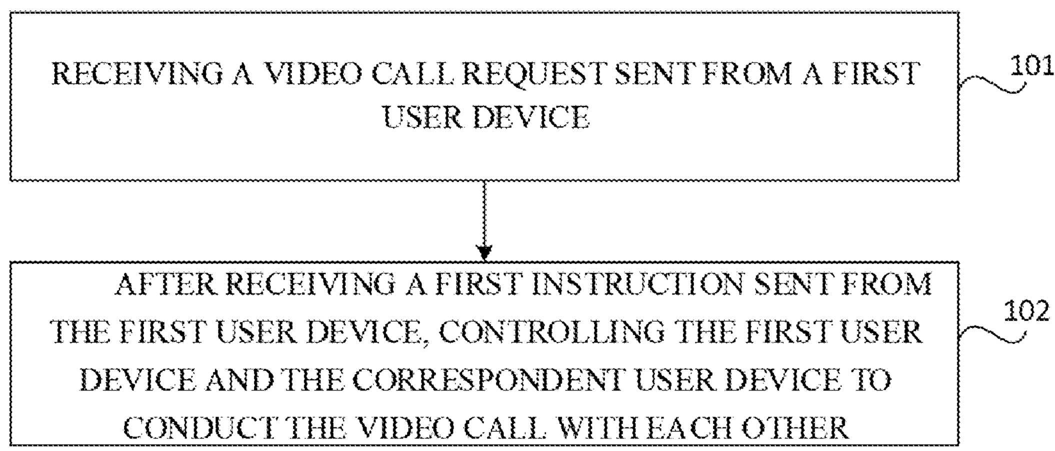
FIG. 1 is a flow chart illustrating a video call method at a serving device according to an exemplary aspect of the present disclosure.

FIG. 1 is a flow chart illustrating a video call method applicable to a serving device (i.e., the method is performed by a serving device) according to an exemplary aspect. As shown FIG. 1, the method includes the following steps.

Step 101: receiving a video call request sent from a first user device. The video call request requests conducting a video call with a correspondent user device (e.g., second user device).

Optionally, the first user device may include a plurality of devices, such as a mobile phone, a tablet computer, a desktop computer and various smart devices. The video call request may be generated when a user performs a preset operation on the video call interface. For example, the preset operation may be a clicking operation or a sliding operation along a designated direction, which is made by the user based on a designated area on a touch screen of the user device.

Optionally, after or when sending the video call request, the first user device starts a camera to enter into a selfie mode. In the selfie mode, the initiator of the video call (i.e., the first user) may check and tidy his/her dressing and appearance through the first user device.

Step 102: after receiving a first instruction sent from the first user device, controlling the first user device and the correspondent user device to conduct the video call with each other.

After receiving the video call request sent from the first user device, the serving device further needs to forward the video call request to the correspondent user device of the video call. Optionally, the video call request may be sent to the correspondent user device after the first instruction sent from the first user device is received, or the video call request may be sent to the correspondent user device after the video call request sent from the first user device is received. In the case where the video call request is sent to the correspondent user device after the first instruction sent from the first user device is received, the first user is allowed to confirm his/her dressing and appearance are proper before the video call request is sent to the correspondent user device, so that an opportunity is provided for the first user to cancel the video call request in time. In the case where the server forwards the video call request to the correspondent user device immediately after receiving the request, the correspondent user device is allowed to receive the video call request immediately. In the latter case, while the first user prepares for conducting a video call with the owner of the correspondent user device (i.e., the second user), the second user may also prepare for conducting the video call with the first user in the meantime. That is, while the first user is checking his/her dressing and appearance, the second user has received the video call request and begins checking his/her dressing and appearance, thereby saving the time for setting up the video call.

As an example, in the process of initiating a video call request by the first user based on the first user device, the video call request is generated after the first user clicks a "video chat" button, and the serving device may not send the video call request to the correspondent user device immediately. Instead, a selfie mode may be started at the first user device; and the serving device may send the video call request to the correspondent user device, after the first user confirms it again or a preset time period has passed since the selfie mode is started (i.e., after the first user device sends a first instruction). The first instruction may carry the video call request, and thus the first user device sends the video call request to the serving device while sending the first instruction.

Optionally, the first instruction is generated after or at the end of the selfie mode, and no corresponding video call content is generated for contents photographed in the selfie mode before the first instruction is generated. The selfie mode may end based on a designated operation performed by the first user through the first user device. The first instruction instructs the serving device to control the first user device and the correspondent user device to conduct the video call with each other. The first instruction may carry identification information of the first user device, identification information of the correspondent user device, or both.

When the serving device receives the first instruction sent from the first user device, the serving device learns that the first user is ready. Therefore, after the serving device receives the first instruction, the serving device may immediately control the first user device and the correspondent user device to conduct the video call with each other, and may control them to send their respective video call contents photographed in real time to each other.

In one aspect, controlling the first user device and the correspondent user device to conduct the video call with each other may include the following steps.

A notification message sent from the correspondent user device is received, the notification message notifying the serving device that the correspondent user device accepts the video call request sent from the first user device. After a second instruction from the correspondent user device is received, the correspondent user device and the first user device are controlled to conduct the video call with each other. The second instruction instructs the serving device to control the first user device and the correspondent user device to conduct the video call with each other; and the second instruction is generated after or at the end of a selfie mode started by the correspondent user device. Before the second instruction is generated, no corresponding video call content is generated for contents photographed by the correspondent user device in the selfie mode.

The serving device might receive from the correspondent user device a message refusing the video call request, even after receiving the notification message sent from the correspondent user device. That is, the present aspect supports the following case: after the correspondent user device accepts the video call request sent from the first user device, the second user may refuse the video call request if he/she sees his/her bad state in the selfie mode.

Optionally, the correspondent user device may include a plurality of devices, such as a mobile phone, a tablet computer, a desktop computer and various smart devices. The notification message may be generated and sent when the second user performs a preset operation on the video call function interface. For example, the preset operation may be a clicking operation or a sliding operation along a designated direction, which is made by the user based on a designated area on a touch screen of the correspondent user device.

Figure 2:
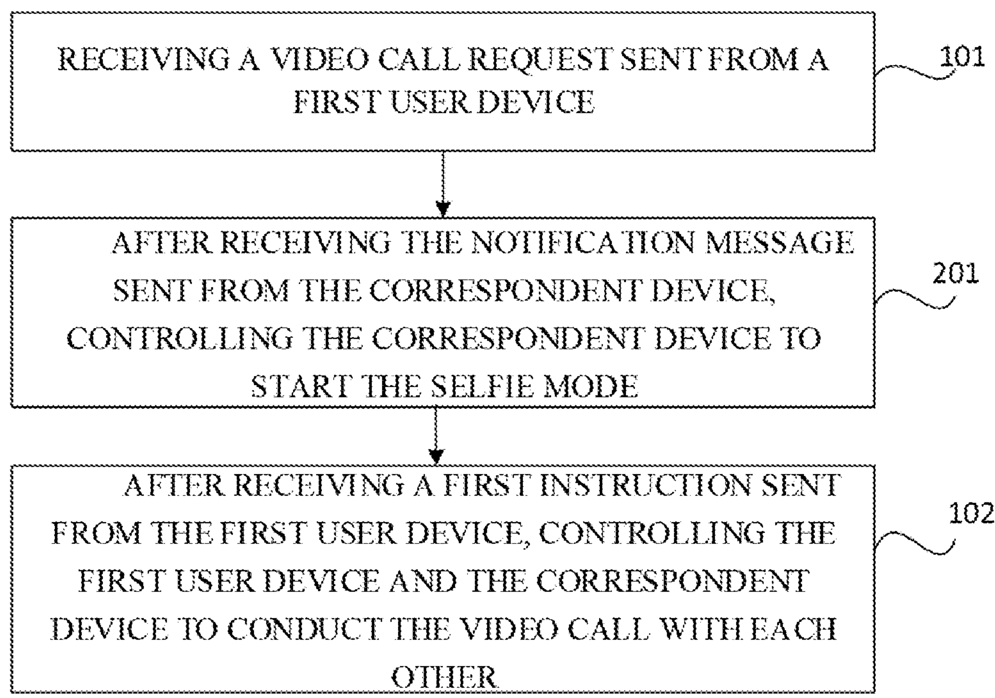
FIG. 2 is a flow chart illustrating a video call method at a serving device according to an exemplary aspect of the present disclosure.

FIG. 2 is a flow chart illustrating a video call method according to another exemplary aspect. As shown in FIG. 2, the method, on the basis of FIG. 1, further includes Step 201: after receiving the notification message sent from the correspondent user device, controlling the correspondent user device to start the selfie mode.

In Step 201, after receiving the notification message sent from the correspondent user device, the serving device sends the notification message to the first user device, and controls the correspondent user device to start a selfie mode. The serving device may instruct, by sending an instruction, the correspondent user device to start a camera, which may be a front camera of the correspondent user device, for the second user to check his/her dressing and appearance state in the selfie mode. It should be noted that until the correspondent user device conducts a video call with the first user device, contents photographed by the correspondent user device are not transmitted to the first user device, but are displayed only on the correspondent user device.

Figure 3:
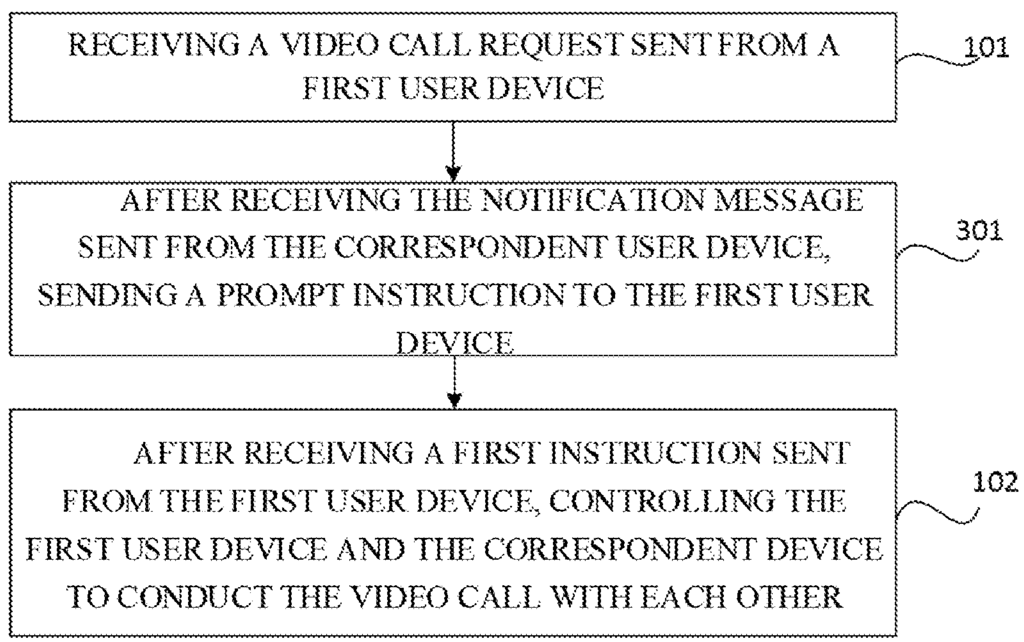
FIG. 3 is a flow chart illustrating a video call method at a serving device according to an exemplary aspect of the present disclosure.

FIG. 3 is a flow chart illustrating a video call method according to an exemplary aspect. As shown in FIG. 3, the method, on the basis of FIG. 1, further includes Step 301: after receiving the notification message sent from the correspondent user device, sending a prompt instruction to the first user device, prompting that the correspondent user device has accepted the video call request.

After receiving the notification message sent from the correspondent user device, the serving device sends the prompt instruction to the first user device immediately. After the first user device receives the first instruction, the first user device may present the prompt instruction on the human-computer interaction interface of the first user device, so as to prompt the first user that the correspondent user device has received the video call request sent from the first user and accepts the video call request. That is, when the first user device receives the prompt instruction from the serving device, it is indicated that the correspondent user has received the video call request and accepts the video call request.

It should be noted that each of the above Step 201 and Step 301 is performed after Step 101. However, the sequence of performing the two steps may be set according to actual needs. Specifically, Step 201 may be performed before or after Step 301.

In the above, aspects at a serving device have been described. In the following, aspects at a first user device will be described in detail.

Figure 4:
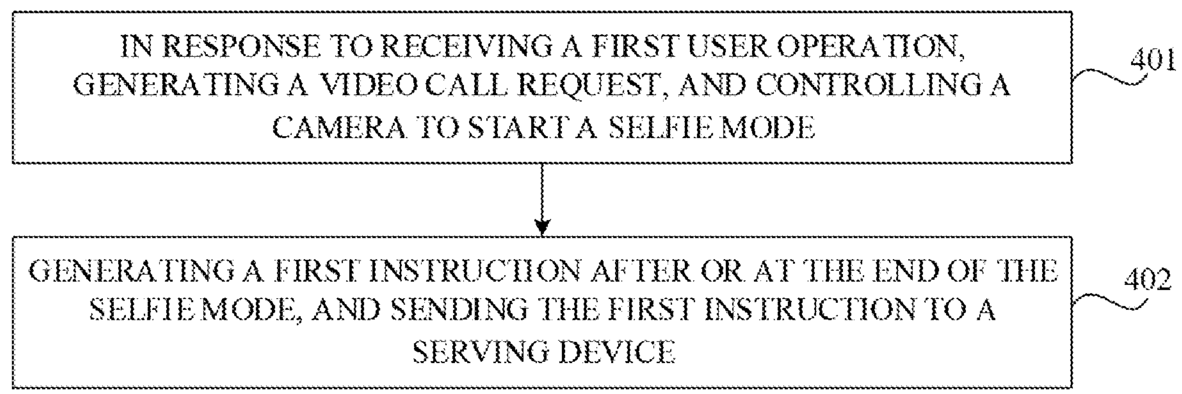
FIG. 4 is a flow chart illustrating a video call method at a first user device according to an exemplary aspect of the present disclosure.

FIG. 4 is a flow chart illustrating a video call method performed by a first user device according to another exemplary aspect. As shown in FIG. 4, the method includes the following steps.

Step 401: in response to receiving a first user operation, generating a video call request, and controlling a camera to start a selfie mode.

The video call request requests conducting a video call with a correspondent user device. The first user operation causes generation of the video call request, and the operation may sent by the first user through the first user device.

In Step 401, after receiving the first user operation, the first user device generates the video call request, starts a camera of the first user device, and starts a selfie mode, for the first user to check his/her dressing and appearance. If the first user confirms that his/her dressing and appearance are proper, the first user may end the selfie mode by operating the first user device.

Step 402: generating a first instruction after or at the end of the selfie mode, and sending the first instruction to a serving device so as to instruct the serving device to control, based on the video call request, the correspondent user device and the first user device to conduct the video call with each other.

In Step 402, after or at the end of the selfie mode, the first user device generates the first instruction, which instructs the serving device to control, based on the video call request, the correspondent user device and the first user device to set up a call connection. The video call request may carry identification information of the first user device, identification information of the correspondent user device, or both.

As an example, the first instruction may be generated, in a case where a first preset time period has passed since the video call request is generated or in the case where a second user operation is received. For example, the first preset time period may be 10 seconds.

In the above, aspects at a serving device and a first user device have been described. In the following, aspects at a correspondent user device will be described in detail.

Figure 5:
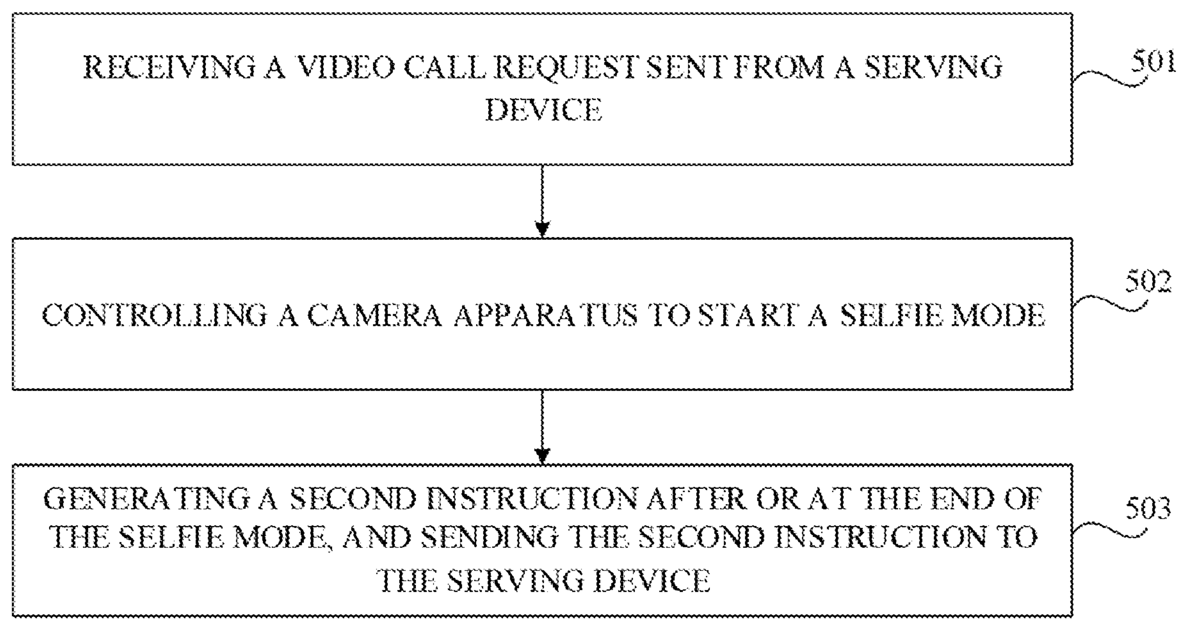
FIG. 5 is a flow chart illustrating a video call method at a correspondent user device according to an exemplary aspect of the present disclosure.

FIG. 5 is a flow chart illustrating a video call method performed by a correspondent user device according to another exemplary aspect. As shown in FIG. 5, the method includes the following steps.

Step 501: receiving a video call request sent from a serving device.

The video call request requests the correspondent user device to conduct a video call with a first user device.

Step 502: controlling a camera to start a selfie mode.

In Step 502, the correspondent user device may start the selfie mode based on a received instruction from the serving device. Alternatively, the video call request may be used as a trigger instruction triggering the correspondent user device to start the camera, and the correspondent user device may start the camera after receiving the video call request. The camera may be a front camera of the correspondent user device. After controlling the camera to start the selfie mode, the second user may check his/her dressing and appearance in the selfie mode. If the second user confirms that his/her dressing and appearance are proper, the second user may end the selfie mode.

Step 503: generating a second instruction after or at the end of the selfie mode, and sending the second instruction to the serving device so as to instruct the serving device to control the correspondent user device and the first user device to conduct the video call with each other.

In step 503, the selfie mode may end based on an instruction operation performed by the second user through the correspondent user device. Generation of the second instruction indicates that the second user agrees to conduct the video call with the first user. After the correspondent user device instructs the serving device to conduct the video call with the first user device by the second instruction, the correspondent user device and the first user device may send their video contents photographed in real time to each other.

If the second user sees his/her bad state in the selfie mode, the second user may directly refuse the video call request sent from the first user device. In such case, the selfie mode ends, and accordingly, the second instruction will not be generated.

Figure 6:
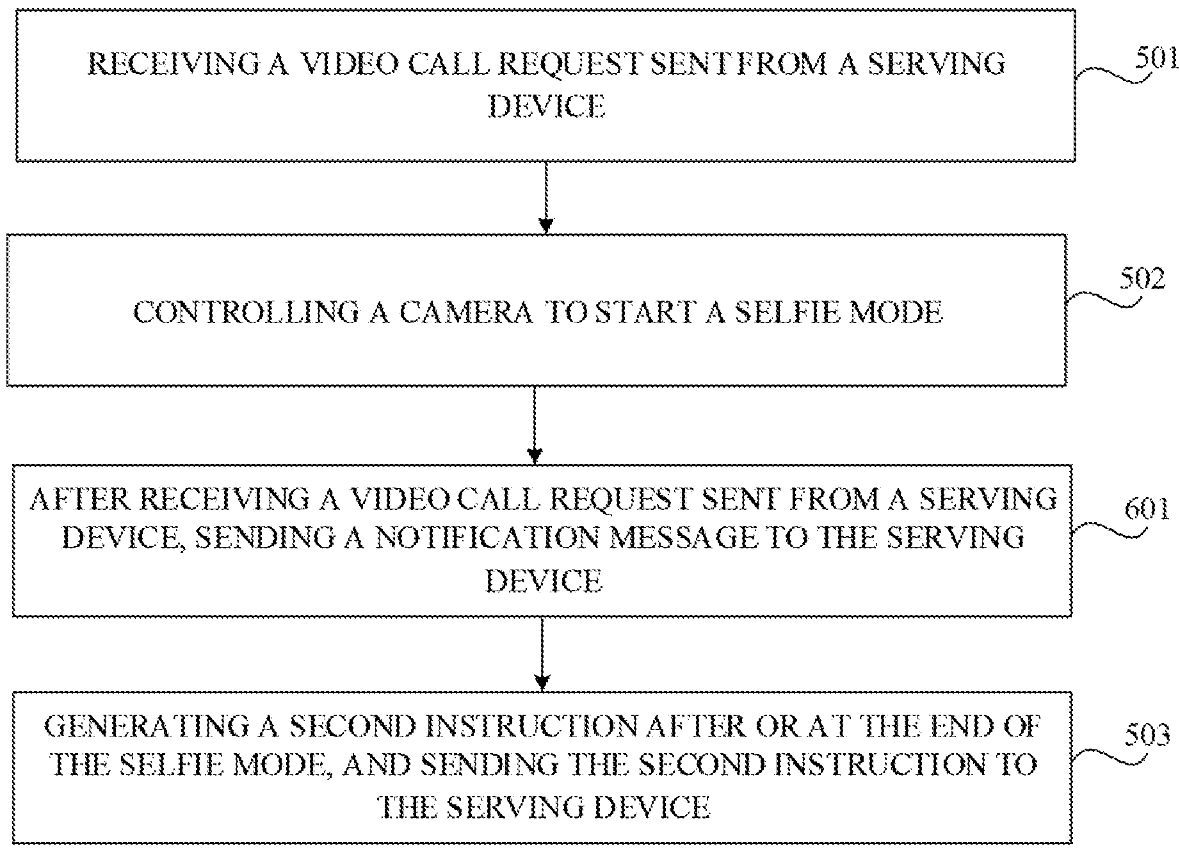
FIG. 6 is a flow chart illustrating a video call method at a correspondent user device according to another exemplary aspect of the present disclosure.

FIG. 6 is a flow chart illustrating a video call method according to another exemplary aspect. As shown in FIG. 6, the method, on the basis of FIG. 5, further includes Step 601: after receiving a video call request sent from a serving device, sending a notification message to the serving device so as to notify the serving device that the correspondent user device accepts the video call request. It should be noted that the sequence of performing Step 601 and Step 502 is not limited to the sequence shown in FIG. 6, but may be such that Step 601 is performed before Step 502.

As an example, the second instruction may be generated, in a case where a second preset time period has passed since the notification message is sent or in a case where a third user operation is received. For example, the second preset time period may be 10 seconds.

According to the present aspect, a video call apparatus for correspondingly performing the above video call method will be provided below.

Figure 7:
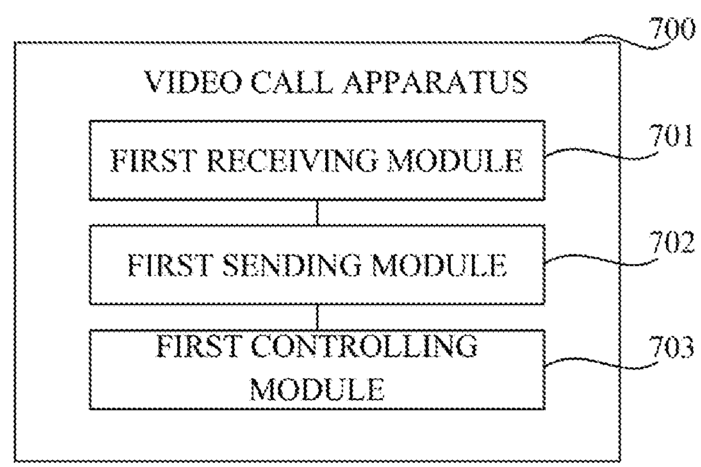
FIG. 7 is a block diagram illustrating a video call apparatus at a serving device according to an exemplary aspect of the present disclosure.

FIG. 7 is a block diagram illustrating a video call apparatus applicable at a server side according to an exemplary aspect. As shown in FIG. 7, the apparatus 700 includes a first receiving module 701, a first sending module 702 and a first controlling module 703. The first receiving module 701 is configured to receive, from a first user device, a video call request for conducting a video call with a correspondent user device; the first sending module 702 is configured to send an instruction of starting a camera to the first user device; and the first controlling module 703 is configured to control the first user device and the correspondent user device to conduct the video call with each other after receiving a first instruction sent from the first user device. The first instruction instructs the serving device to control the first user device and the correspondent user device to conduct the video call with each other.

Optionally, the first instruction is generated after or at the end of a selfie mode started by the first user device, and no corresponding video call content is generated for contents photographed in the selfie mode before the first instruction is generated.

Optionally, the first controlling module 703 includes: a notification message receiving sub-module configured to receive, from the correspondent user device, a notification message, which notifies the serving device that the correspondent user device accepts the video call request; and a video call controlling sub-module configured to control the correspondent user device and the first user device to conduct the video call with each other after receiving a second instruction from the correspondent user device. The second instruction instructs the serving device to control the first user device and the correspondent user device to conduct the video call with each other, the second instruction is generated after or at the end of a selfie mode started by the correspondent user device, and before the second instruction is generated, no corresponding video call content is generated for contents photographed by the correspondent user device in the selfie mode.

Optionally, the apparatus further includes: a selfie mode start controlling module configured to control the correspondent user device to start a selfie mode after receiving the notification message sent from the correspondent user device.

Optionally, the apparatus further includes: a prompt instruction sending module configured to send a prompt instruction to the first user device after receiving the notification message sent from the correspondent user device. The prompt instruction prompts that the correspondent user device has accepted the video call request.

Figure 8:
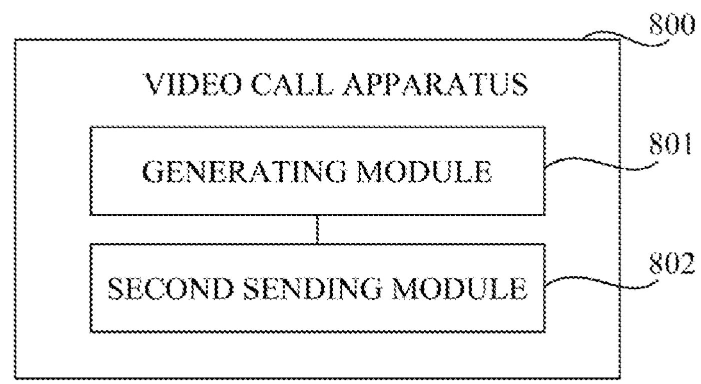
FIG. 8 is a block diagram illustrating a video call apparatus at a first user device according to an exemplary aspect of the present disclosure.

FIG. 8 is a block diagram illustrating a video call apparatus applicable to a first user device according to another exemplary aspect. As shown in FIG. 8, the apparatus 800 includes: a generating module 801 and a second sending module 802. The generating module 801 is configured to, in response to receiving a first user operation, generate a video call request for conducting a video call with a correspondent user device, and control a camera to start a selfie mode. The second sending module 802 is configured to generate a first instruction after or at the end of the selfie mode, and send the first instruction to a serving device so as to instruct the serving device to control, based on the video call request, the correspondent user device and the first user device to conduct the video call with each other.

Optionally, the second sending module 802 includes: a first instruction generating sub-module configured to generate the first instruction in a case where a first preset time period has passed since the video call request is generated or in a case where a second user operation is received.

Figure 9:
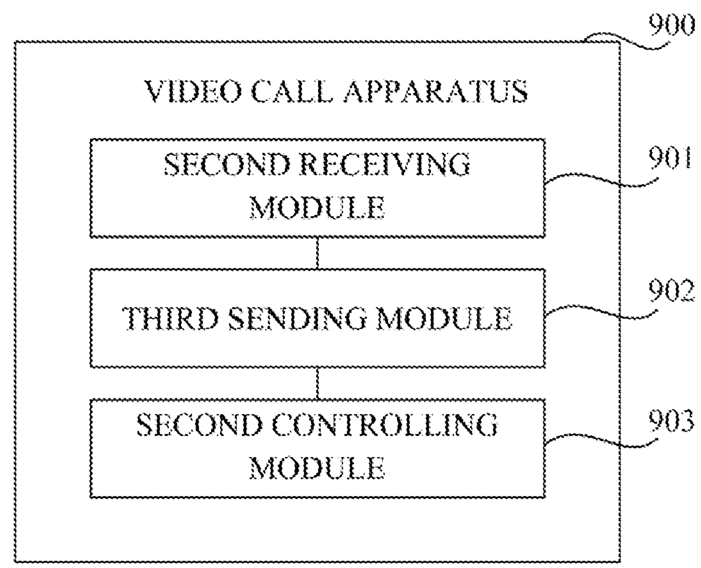
FIG. 9 is a block diagram illustrating a video call apparatus at a correspondent user device according to an exemplary aspect of the present disclosure.

FIG. 9 is a block diagram illustrating a video call apparatus applicable to a correspondent user device according to another exemplary aspect. As shown in FIG. 9, the apparatus 900 includes: a second receiving module 901, a third sending module 902 and a second controlling module 903. The second receiving module 901 is configured to receive, from a serving device, a video call request for the correspondent user device to conduct a video call with a first user device. The third sending module 902 is configured to generate a second instruction after or at the end of the selfie mode, and send the second instruction to the serving device so as to instruct the serving device to control the correspondent user device and the first user device to conduct the video call with each other. The second controlling module 903 is configured to control a camera to start a selfie mode.

Optionally, the apparatus further includes: a notification message sending module configured to send a notification message to a serving device after receiving a video call request sent from the serving device, so as to notify the serving device that the correspondent user device accepts the video call request.

Optionally, the third sending module 902 includes: a second instruction generating module configured to generate the second instruction in a case where a second preset time period has passed since the notification message is sent or in a case where a third user operation is received.

The present disclosure provides a video call apparatus applicable to a serving device and including: a processor; and a memory for storing instructions executable by the processor. The processor is configured to perform any of the video call methods at the serving device.

The present disclosure provides a video call apparatus applicable to a first user device and including: a processor; and a memory for storing instructions executable by the processor. The processor is configured to perform steps of any of the video call methods at the first user device.

The present disclosure provides a video call apparatus applicable to a correspondent user device and including: a processor; and a memory for storing instructions executable by the processor. The processor is configured to perform steps of any of the video call methods at the correspondent user device.

The present disclosure also provides a video call system including any of the above serving devices, any of the above first user devices and any of the above correspondent user devices.

The present disclosure also provides a computer readable storage medium storing computer program instructions thereon that when executed by a processor, cause the processor to implement any of steps according to the video call method at the serving device provided by the present disclosure.

The present disclosure also provides a computer readable storage medium storing computer program instructions thereon. When executed by a processor, the instructions cause the processor to implement steps of any of the video call methods at the first user device provided by the present disclosure.

The present disclosure also provides a computer readable storage medium storing computer program instructions thereon. When executed by a processor, the instructions cause the processor to implement steps of any of the video call methods at the correspondent user device provided by the present disclosure.

Figure 10:
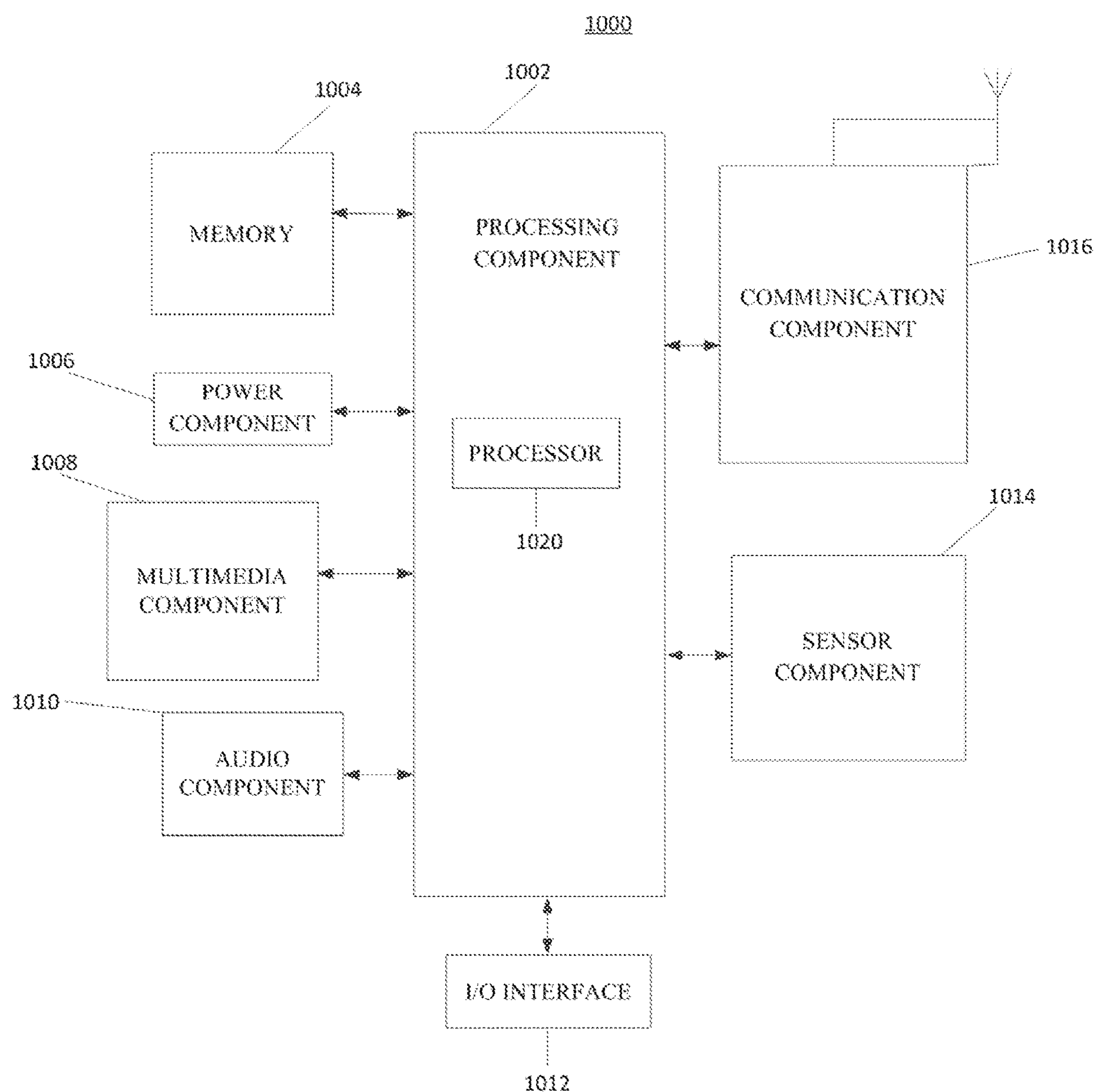
FIG. 10 is a block diagram illustrating a video call apparatus according to an exemplary aspect of the present disclosure.

FIG. 10 is a block diagram illustrating a video call apparatus 1000 according to an exemplary aspect. For example, the apparatus 1000 may be a mobile phone, a computer, a digital broadcast terminal, a message transceiver, a game console, a tablet device, medical equipment, exercise equipment, a personal digital assistant, or the like.

Referring to FIG. 10, the apparatus 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the apparatus 1000, such as the operations associated with display, phone calls, data communications, camera operations and recording operations. The processing component 1002 may include one or more processors 1020 to execute instructions. Moreover, the processing component 1002 may include one or more modules which facilitate the interaction between the processing component 1002 and other components. For example, the processing component 1002 may include a multimedia module to facilitate the interaction between the multimedia component 1008 and the processing component 1002.

The memory 1004 is configured to store various types of data to support operations of the apparatus 1000. Examples of such data include instructions for any applications or methods operated on the apparatus 1000, contact data, phonebook data, messages, pictures, video, etc. The memory 1004 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the apparatus 1000. The power component 1006 may include a power supply management system, one or more power sources, and any other components associated with the generation, management, and distribution of power in the apparatus 1000.

The multimedia component 1008 includes a screen providing an output interface between the apparatus 1000 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with the touch or swipe action. In some aspects, the multimedia component 1008 includes a front camera and/or a rear camera. The front camera and/or the rear camera may receive an external multimedia datum while the apparatus 1000 is in an operation mode, such as a photographing mode or a video mode. Each of the front camera and the rear camera may be a fixed optical lens system or may have focus and optical zoom capability.

The audio component 1010 is configured to output and/or input audio signals. For example, the audio component 1010 includes a microphone (MIC) configured to receive an external audio signal when the apparatus 1000 is in an operation mode, such as a call mode, a recording mode, and a voice recognition mode. The received audio signal may be further stored in the memory 1004 or transmitted via the communication component 1016. In some aspects, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the apparatus 1000. For instance, the sensor component 1014 may detect an open/closed status of the apparatus 1000, relative positioning of components, e.g., the display and the keypad, of the apparatus 1000, a change in position of the apparatus 1000 or a component of the apparatus 1000, a presence or absence of user's contact with the apparatus 1000, an orientation or an acceleration/deceleration of the apparatus 1000, and a change in temperature of the apparatus 1000. The sensor component 1014 may include a proximity sensor configured to detect the presence of nearby objects without any physical contact. The sensor component 1014 may also include a light sensor, such as a CMOS or CCD image sensor, for use in imaging applications. In some aspects, the sensor component 1014 may also include an accelerometer sensor, a gyroscope sensor, a magnetic sensor, a pressure sensor or a temperature sensor.

The communication component 1016 is configured to facilitate communication, wired or wirelessly, between the apparatus 1000 and other devices. The apparatus 1000 can access a wireless network based on a communication standard, such as WiFi, 2G or 3G or a combination thereof. In one exemplary aspect, the communication component 1016 receives a broadcast signal or broadcast associated information from an external broadcast management system via a broadcast channel. In one exemplary aspect, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the apparatus 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the video call method as shown in any of FIGS. 4 to 6.

In exemplary aspects, there is also provided a non-transitory computer readable storage medium including instructions, such as included in the memory 1004, executable by the processor 1020 in the apparatus 1000, for performing the video call methods. For example, the non-transitory computer-readable storage medium may be a ROM, a RAM, a CD-ROM, a magnetic tape, a floppy disc, an optical data storage device, and the like.

Figure 11:
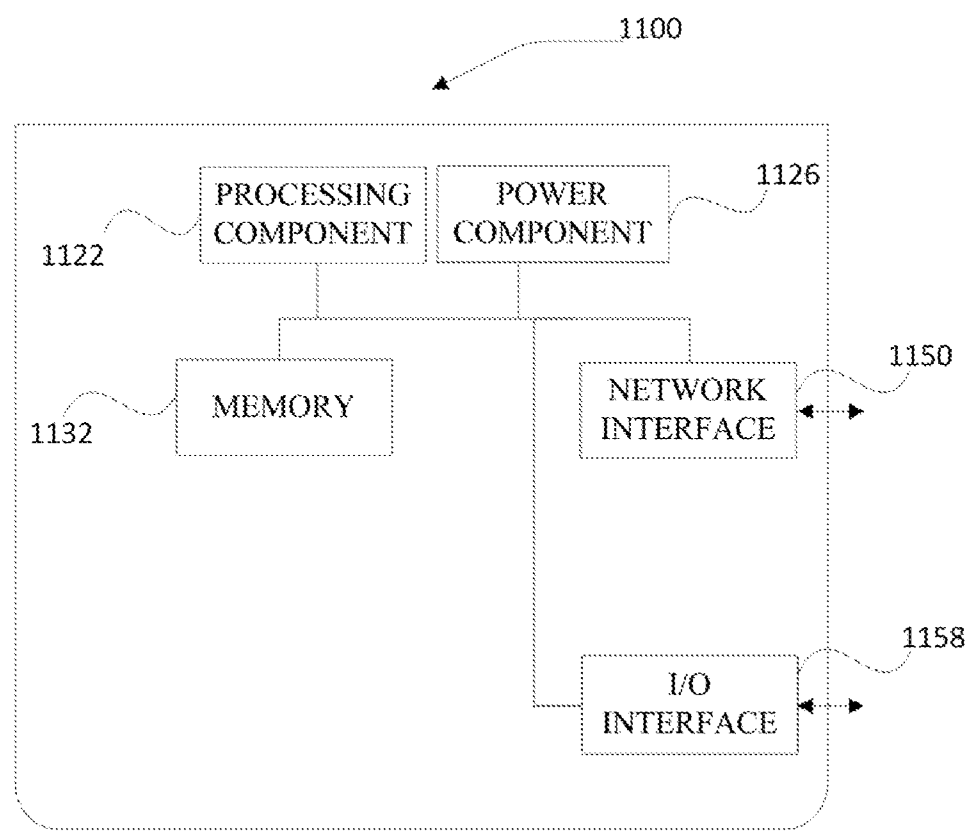
FIG. 11 is a block diagram illustrating a video call apparatus according to another exemplary aspect of the present disclosure.

FIG. 11 is a block diagram illustrating a video call apparatus 1100 according to another exemplary aspect. For example, the apparatus 1100 may be provided as a server. Referring to FIG. 11, the apparatus 1100 includes a processing component 1122, and a memory resource represented by a memory 1132. The processing component 1122 further includes one or more processors, and the memory resource is configured to store instructions, such as application programs, executable by the processing component 1122. Application programs stored in the memory 1132 may include one or more modules each corresponding to a set of instructions. In addition, the processing component 1122 is configured to execute instructions, so as to perform the video call method as shown in any of FIGS. 1 to 3. The apparatus 1100 may also include: a power component 1126 configured to perform a power supply management of the apparatus 1100; a wired or wireless network interface 1150 configured to connect the apparatus 1100 to network; and an input/output (I/O) interface 1158. The apparatus 1100 may operate based on an operating system stored in the memory 1132, such as Windows Server™, Mac OS X™, Unix™, Linux™, FreeBSD™, or the like.

For the above apparatus aspects, ways by which each module thereof performs an operation have been described in detail in the related method aspects, and will not be elaborated herein.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other implementations of the disclosure will be apparent to those skilled in the art from consideration of the specification and practice of the disclosure disclosed here. The present application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A video call method performed by a serving device, the method comprising:

before any connection is established between a first user device and a second user device, receiving, from the first user device, a video call request to conduct a video call with the second user device, wherein the video call request is initiated at the first user device, and wherein a countdown of a preset time period is initiated by the first user device upon transmission of the video call request from the first user device;

receiving, from the first user device, a first instruction that is configured to instruct the serving device to control the first user device and the second user device to conduct the video call with each other, wherein the first instruction is transmitted by the first user device to the serving device upon either one of (i) an expiration of the countdown of the preset time period at the first user device or (ii) a confirmation operation by a user at the first user device that confirms the video call request;

in response to receiving the first instruction, determining that the first user device is ready to conduct the video call, and transmitting the video call request from the serving device to the second user device; and controlling the first user device and the second user device to conduct the video call with each other based on the first instruction.

2. The video call method according to claim 1, wherein the first instruction is generated by the first user device after a selfie mode is initiated by the first user device and before any corresponding video call content is generated for contents photographed by the first user device in the selfie mode.

3. The video call method according to claim 2, wherein controlling the first user device and the second user device to conduct the video call with each other comprises:

receiving, from the second user device, a notification message that is configured to notify the serving device that the second user device accepts the video call request; and receiving, from the second user device, a second instruction that is configured to instruct the serving device to control the first user device and the second user device to conduct the video call with each other, wherein the second instruction is generated by the second user device after a selfie mode is initiated by the second user device and before any corresponding video call content is generated for contents photographed by the second user device in the selfie mode.

4. The video call method according to claim 3, further comprising:

after receiving the notification message from the second user device, controlling the second user device to initiate the selfie mode.

5. The video call method according to claim 3, further comprising:

after receiving the notification message from the second user device, sending a prompt instruction to the first user device, wherein the prompt instruction is configured to instruct the first user device to generate a prompt indicating that the second user device has accepted the video call request.

6. The video call method according to claim 4, further comprising:

after receiving the notification message from the second user device, sending a prompt instruction to the first user device, wherein the prompt instruction is configured to instruct the first user device to generate a prompt indicating that the second user device has accepted the video call request.

7. The video call method according to claim 1, wherein the first user device is configured to:

in response to receiving a first user operation, generate the video call request to conduct the video call with the second user device;

control a camera to initiate a selfie mode;

generate the first instruction after initiating the selfie mode; and send the first instruction to the serving device so as to instruct the serving device to control, based on the video call request, the second user device and the first user device to conduct the video call with each other.

8. The video call method according to claim 7, wherein the first instruction is generated when a first preset time period has passed since the video call request is generated or when a second user operation is received.

9. The video call method according to claim 1, wherein the second user device is configured to:

receive, from the serving device, the video call request for the second user device to conduct the video call with the first user device;

control a camera to initiate a selfie mode;

generate a second instruction after initiating the selfie mode; and send the second instruction to the serving device so as to instruct the serving device to control the second user device and the first user device to conduct the video call with each other.

10. The video call method according to claim 9, wherein the second user device is further configured to, after receiving the video call request sent from the serving device, send a notification message to the serving device so as to notify the serving device that the second user device accepts the video call request.

11. The video call method according to claim 8, wherein the second instruction is generated when a second preset time period has passed since the notification message is sent or when a third user operation is received.

12. The video call method according to claim 9, wherein the second instruction is generated when a second preset time period has passed since the notification message is sent or when a third user operation is received.

13. A serving device, comprising:

a processor; and a memory storing instructions executable by the processor, wherein the processor is configured to:

before any connection is established between a first user device and a second user device, receive, from the first user device, a video call request to conduct a video call with the second user device, wherein the video call request is initiated at the first user device, and wherein a countdown of a preset time period is initiated by the first user device upon transmission of the video call request from the first user device;

receive, from the first user device, a first instruction that is configured to instruct the serving device to control the first user device and the second user device to conduct the video call with each other, wherein the first instruction is transmitted by the first user device to the serving device upon either one of (i) an expiration of the countdown of the preset time period at the first user device or (ii) a confirmation operation by a user at the first user device that confirms the video call request;

in response to receiving the first instruction, determine that the first user device is ready to conduct the video call, and transmit the video call request from the serving device to the second user device; and control the first user device and the second user device to conduct the video call with each other based on the first instruction.

14. The serving device according to claim 13, wherein the first instruction is generated by the first user device after a selfie mode is initiated by the first user device and before any corresponding video call content is generated for contents photographed by the first user device in the selfie mode.

15. The serving device according to claim 14, wherein the processor is further configured to:

receive, from the second user device, a notification message that is configured to notify the serving device that the second user device accepts the video call request; and receive, from the second user device, a second instruction that is configured to instruct the serving device to control the first user device and the second user device to conduct the video call with each other, wherein the second instruction is generated by the second user device after a selfie mode is initiated by the second user device and before any corresponding video call content is generated for contents photographed by the second user device in the selfie mode.

16. The serving device according to claim 15, wherein the processor is further configured to:

after receiving the notification message from the second user device, control the second user device to initiate the selfie mode.

17. The serving device according to claim 15, wherein the processor is further configured to:

after receiving the notification message from the second user device, send a prompt instruction to the first user device, wherein the prompt instruction is configured to instruct the first user device to generate a prompt indicating that the second user device has accepted the video call request.

18. The serving device according to claim 13, wherein the first user device is configured to:

in response to receiving a first user operation, generate the video call request to conduct the video call with the second user device;

control a camera to initiate a selfie mode;

generate the first instruction after initiating the selfie mode; and send the first instruction to the serving device so as to instruct the serving device to control, based on the video call request, the second user device and the first user device to conduct the video call with each other.

19. The serving device according to claim 13, wherein the second user device is configured to:

receive, from the serving device, the video call request for the second user device to conduct the video call with the first user device;

control a camera to initiate a selfie mode;

generate a second instruction after initiating the selfie mode; and send the second instruction to the serving device so as to instruct the serving device to control the second user device and the first user device to conduct the video call with each other.

20. A non-transitory computer-readable medium storing instructions that, when executed by one or more processors of a serving device, cause the serving device to:

before any connection is established between a first user device and a second user device, receive, from the first user device, a video call request to conduct a video call with the second user device, wherein the video call request is initiated at the first user device, and wherein a countdown of a preset time period is initiated by the first user device upon transmission of the video call request from the first user device;

receive, from the first user device, a first instruction that is configured to instruct the serving device to control the first user device and the second user device to conduct the video call with each other, wherein the first instruction is transmitted by the first user device to the serving device upon either one of (i) an expiration of the countdown of the preset time period at the first user device or (ii) a confirmation operation by a user at the first user device that confirms the video call request;

in response to receiving the first instruction, determine that the first user device is ready to conduct the video call, and transmit the video call request from the serving device to the second user device; and control the first user device and the second user device to conduct the video call with each other based on the first instruction.

* * * * *